US012717661B2

(12) United States Patent
Wang et al.

(10) Patent No.: US 12,717,661 B2
(45) Date of Patent: Aug. 25, 2026

(54) EVENT PROCESSING METHOD AND DEVICE

(71) Applicant: Spreadtrum Communications (Shanghai) Co., Ltd., Shanghai (CN)

(72) Inventors: Yanping Wang, Shanghai (CN); Zhiwen Liu, Shanghai (CN); Ling Zhou, Shanghai (CN); Wei Lu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 384 days.

(21) Appl. No.: 18/265,100

(22) PCT Filed: Oct. 27, 2021

(86) PCT No.: PCT/CN2021/126596
§ 371 (c)(1),
(2) Date: Jun. 2, 2023

(87) PCT Pub. No.: WO2022/116745
PCT Pub. Date: Jun. 9, 2022

(65) Prior Publication Data

US 2024/0004730 A1 Jan. 4, 2024

(30) Foreign Application Priority Data

Dec. 4, 2020 (CN) ......................... 202011404185.4

(51) Int. Cl.
*G06F 9/54* (2006.01)
*G06F 9/48* (2006.01)

(52) U.S. Cl.
CPC ............ *G06F 9/542* (2013.01); *G06F 9/4837* (2013.01)

(58) Field of Classification Search
CPC ...... G06F 9/542; G06F 9/4837; G06F 9/4881; Y02D 30/70; H04W 72/569
See application file for complete search history.

(56) References Cited

U.S. PATENT DOCUMENTS 6,085,215 A 7/2000 Ramakrishnan et al.
9,639,401 B1 5/2017 Bertram et al.
(Continued)

FOREIGN PATENT DOCUMENTS

CN 1503943 A 6/2004
CN 108762905 A 11/2018
(Continued)

OTHER PUBLICATIONS

International Search Report for corresponding PCT Application No. PCT/CN2021/126596.
(Continued)

*Primary Examiner* — Peng Ke
(74) *Attorney, Agent, or Firm* — JCIPRNET

(57) ABSTRACT

An event processing method provided by an embodiment of the present disclosure determines M events, where each event is associated with a priority and a minimum working time, M is an integer greater than 1, and the minimum working time of each event is less than duration of a time slice; processes a first event within a first time slice, where the first event is an event having a highest priority among the M events; and in the case that processing duration of the first event reaches the minimum working time of the first event, determines to continue to process the first event within the first time slice, or determines to interrupt processing of the first event and processes a second event within the first time slice.

15 Claims, 4 Drawing Sheets

(56) References Cited

U.S. PATENT DOCUMENTS

| | | | | |
|---|---|---|---|---|
| 2014/0086128 | A1* | 3/2014 | Gomez | H04W 52/02<br>375/222 |
| 2014/0366032 | A1 | 12/2014 | Granshaw et al. | |
| 2016/0077870 | A1* | 3/2016 | Pho | G06F 9/4881<br>718/103 |
| 2019/0114202 | A1* | 4/2019 | Wang | G06F 9/5044 |
| 2020/0137769 | A1* | 4/2020 | Sun | H04L 5/0037 |
| 2022/0237029 | A1* | 7/2022 | Kwon | H01M 10/4207 |
| 2023/0127112 | A1* | 4/2023 | Tsirkin | G06F 9/4881<br>718/103 |

FOREIGN PATENT DOCUMENTS

| | | |
|---|---|---|
| CN | 111651864 A | 9/2020 |
| CN | 111683354 A | 9/2020 |
| CN | 112616192 A | 4/2021 |

OTHER PUBLICATIONS

Notice of Allowance for Chinese Priority Application number 202011404185.4 filed on Apr. 12, 2020 (Chinese Patent No. 2023033000172950).

First Office Action for Chinese Priority Application number 202011404185.4 filed on Apr. 12, 2020 (Chinese Patent No. 2023033000172950).

* cited by examiner

EVENT PROCESSING METHOD AND DEVICE

The present application is a National Stage of International Application No. PCT/CN2021/126596, filed on Oct. 27, 2021, which claims priority to Chinese Patent Application No. 2020114041854, titled "EVENT PROCESSING METHOD AND DEVICE", filed to China National Intellectual Property Administration on Dec. 4, 2020, both of the above applications are incorporated herein by reference in their entireties.

TECHNICAL FIELD

The present disclosure relates to technical field of communication, in particular to an event processing method and device.

BACKGROUND

In the field of wireless communication, depending on the actual application scenarios, a device may need to be connected to multiple devices at the same time. For example, in Bluetooth communication, in addition to connecting multiple devices, other events such as connection scanning, bluetooth low energy (BLE) broadcasting, BLE scanning and multiple BLE connections need to be continued. Each event requires certain time slices. An event conflict may occur when two or more events need to work at the same time.

Usually, one of the conflicting events in the same time slice can be selected for processing based on a certain strategy.

However, with the increasing complexity of services, time slice conflicts of events will become more frequent, which will affect the processing efficiency of services.

SUMMARY

Embodiments of the disclosure provide an event processing method and apparatus, which relates to the technical field of wireless communication.

In a first aspect, an embodiment of the disclosure provides an event processing method, including: determining M events, where each event is associated with a priority and a minimum working time, M is an integer greater than 1, and the minimum working time of each event is less than duration of a time slice; processing a first event within a first time slice, where the first event is an event with a highest priority among the M events; and in a case that processing duration of the first event reaches the minimum working time of the first event, determining to continue to process the first event within the first time slice, or determining to interrupt processing of the first event and processing a second event within the first time slice.

In a second aspect, an embodiment of the disclosure provides an event processing apparatus, including: a processing module, configured to determine M events, where each event is associated with a priority and a minimum working time, M is an integer greater than 1, and the minimum working time of each event is less than duration of a time slice; the processing module is further configured to process a first event within a first time slice, where the first event is an event with a highest priority among the M events; and a determining module, configured to in a case that processing duration of the first event reaches the minimum working time of the first event, determine to continue to process the first event within the first time slice, or determine to interrupt processing of the first event and process a second event within the first time slice.

In a third aspect, an embodiment of the present disclosure provides an electronic device, including: at least one processor and a memory, the memory stores computer executable instructions;

the at least one processor execute the computer executable instructions stored in the memory to cause the at least one processor to implement the event processing method according to the first aspect.

In a fourth aspect, an embodiment of the present disclosure provides computer readable storage medium, where the computer readable storage medium stores computer executable instructions, which when executed by a processor, implements the event processing method according to the first aspect.

Embodiments of the disclosure provide an event processing method and apparatus, including: determining M events, where each event is associated with a priority and a minimum working time, M is an integer greater than 1, and the minimum working time of each event is less than duration of a time slice; processing a first event within a first time slice, where the first event is an event with a highest priority among the M events; and in a case that processing duration of the first event reaches the minimum working time of the first event, determining to continue to process the first event within the first time slice, or determining to interrupt processing of the first event and processing a second event within the first time slice.

BRIEF DESCRIPTION OF DRAWINGS

The accompanying drawings, which are incorporated in and constitute a part of the specification, illustrate embodiments consistent with the disclosure and together with the description, serve to explain the principles of the disclosure.

Through the following accompanying drawings, specific embodiments of the present disclosure have been shown, which will be described in more details later. These drawings and written descriptions are not intended to limit the scope of the disclosed concepts in any way, but to explain the disclosed concepts to those skilled in the art by referring to specific embodiments.

DESCRIPTION OF EMBODIMENTS

Reference will now be made in detail to exemplary embodiments, examples of which are illustrated in the accompanying drawings. When the following description refers to the drawings, unless otherwise indicated, the same numbers in different drawings indicate the same or similar elements. The implementations described in the following exemplary embodiments do not represent all embodiments consistent with the present disclosure. Rather, they are merely examples of apparatus and methods consistent with some aspects of the present disclosure as detailed in the appended claims.

The embodiment of the disclosure can be applied to various communication systems, such as a global system of mobile communication (GSM) system, code division multiple access (CDMA) system, wideband code division multiple access (WCDMA) system, general packet radio service (GPRS), long term evolution (LTE) system, advanced long term evolution (LTE-A) system, New Radio (NR) system, evolution system of NR system, LTE-based access to unlicensed spectrum (LTE-U) system, NR-based access to unlicensed spectrum (NR-U) system, universal mobile telecommunications system (UMTS), wireless local area networks (WLAN), wireless fidelity (WiFi), next generation communication systems or other communication systems.

Generally speaking, number of connections supported by traditional communication systems is limited, and it is easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, etc. Embodiments of the present disclosure can also be applied to these communication systems.

Figure 1:
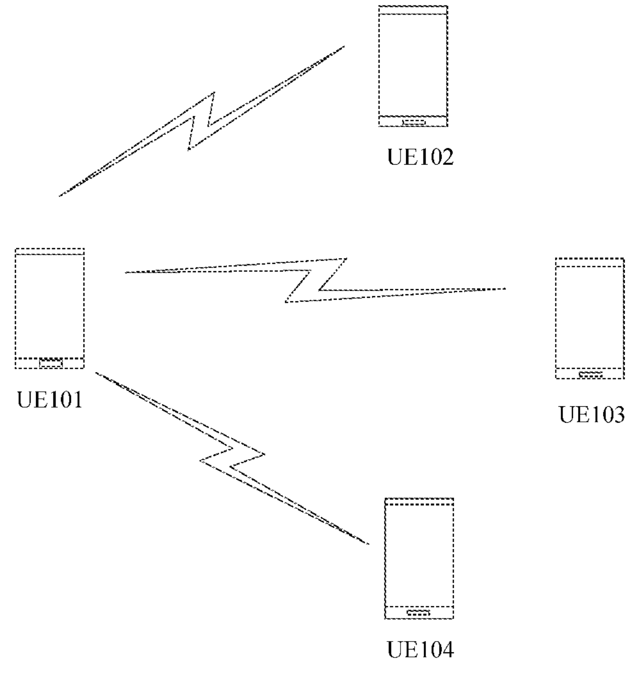
FIG. 1 is a schematic diagram of a communication scenario provided by an embodiment of the present disclosure.

Referring to FIG. 1, which is a schematic diagram of a communication scenario provided by an embodiment of the present disclosure.

As shown in FIG. 1, when communication connections of UE101 with UE102, UE103 and UE104 are required at the same time, three events will occur in the same time slice: UE101 connecting with UE102, UE101 connecting with UE103 and UE101 connecting with UE104. These three events may conflict within the time slice. When the above-mentioned multiple events conflict, the conflict events can be reasonably processed within the time slice through an event processing method provided by embodiments of the disclosure.

Among them, the user equipment (UE)101, UE102, UE103 and UE104 can refer to various forms of user equipment, access terminals, subscriber units, subscriber stations, mobile sites, mobile stations (MS for short), remote stations, remote terminals, mobile devices, terminal equipment, wireless communication equipment, user agent or user apparatus. It can also be a cellular phone, a cordless phone, a session initiation protocol (SIP for short) phone, a wireless local loop (WLL for short) station, a personal digital assistant (PDA for short), handheld devices with wireless communication function, computing devices or other processing devices connected to wireless modems, vehicle-mounted devices, wearable devices, terminal devices in future 5G networks or terminal devices in future evolved public land mobile network (PLMN for short), etc., which are not limited by embodiments of this disclosure.

It can be understood that the communication scenario shown in FIG. 1 is only an example of an event processing method, and is not used as a limitation to the embodiment of the present disclosure.

At present, when multiple events conflict within a time slice, one of the multiple events can be selected based on certain strategies, such as random selection or based on the importance of the events, and the selected event can be processed in the time slice. It can also be understood that other events are abandoned in the time slice.

Figure 2:
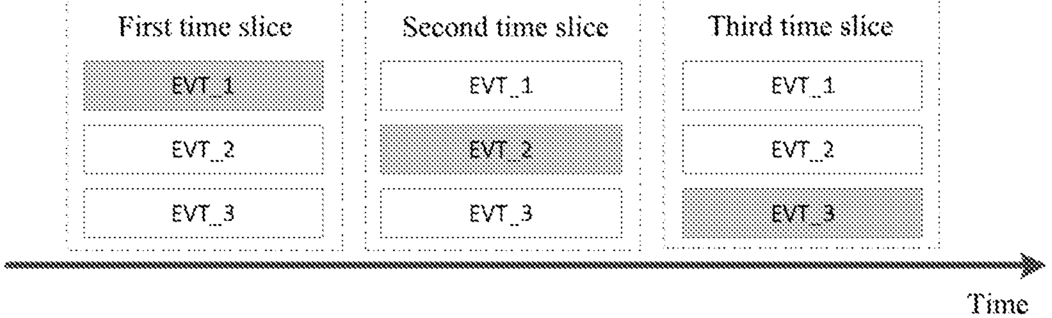
FIG. 2 is a first schematic diagram of an event processing method provided by an embodiment of the present disclosure.

Referring to FIG. 2, which is a first schematic diagram of an event processing method provided by an embodiment of the present disclosure.

As shown in FIG. 2, event or (EVT) 1 represents event 1, EVT_2 represents event 2 and EVT_3 represents event 3; when EVT_1, EVT_2 and EVT_3 conflict in the first time slice, one event EVT_1 can be selected for processing within the first time slice, which can be understood as giving up EVT_2 and EVT_3 within the first time slice. EVT_2 is placed in the second time slice and EVT_3 is placed in the third time slice for processing.

However, the above processing method of the events needs to abandon some events, which makes the utilization rate of time slices low. When the complexity of the service is getting higher and higher, the conflicts of time slices of events will become more frequent, which will make it difficult to ensure the effective work of the service, and even need to abandon some services, thus affecting the processing efficiency of the service.

In order to solve the above technical problems, an event processing method is provided in embodiments of the disclosure, including: determining M events, where each event is associated with a priority and a minimum working time, M is an integer greater than 1, and the minimum working time of each event is less than duration of a time slice; processing a first event within a first time slice, where the first event is an event with a highest priority among the M events; and in a case that processing duration of the first event reaches the minimum working time of the first event, determining to continue to process the first event within the first time slice, or determining to interrupt processing of the first event and processing a second event within the first time slice. In this way, when there is a time conflict in a time slice, events can be processed reasonably in the time slice based on the minimum working time and priorities of the events, and the multiplexing of time slices can be realized, thus improving the processing efficiency of services. Please refer to the following embodiment s of the disclosure for details.

Figure 3:
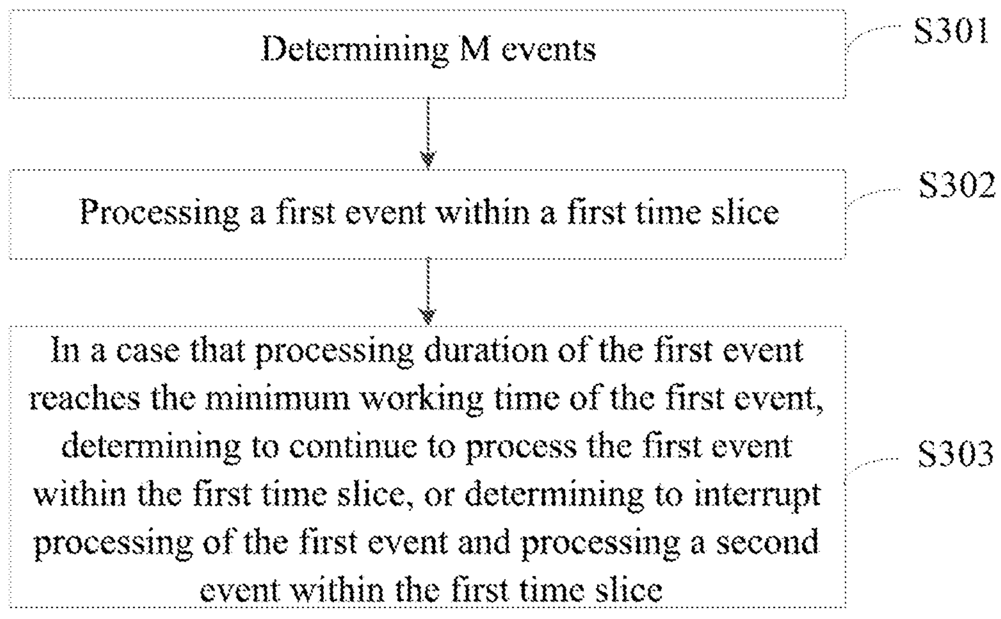
FIG. 3 is a flowchart of an event processing method provided by an embodiment of the present disclosure.

Referring to FIG. 3, which is a flowchart of an event processing method provided by an embodiment of the present disclosure.

S301, determining M events.

In embodiments of the disclosure, each event is associated with a priority and a minimum working time, M is an integer greater than 1, and the minimum working time of each event is less than the duration of the time slice.

For example, when sending an event (or sending a data packet, which includes a header), correspondingly, when receiving an event, the header of an event is generally received first, which includes information of the event, and whether to continue to process the event can be determined based on the information of the event in the header. The minimum working time can be time required to receive the header of the event.

For another example, the priority can be determined based on other possible reasons such as the frequency of events or the duration of events. For example, set a higher priority for frequently processed events and a lower priority for occasionally processed events; alternatively, set a higher priority for events that run for a long time and a lower priority for events that run for a short time.

It can be understood that the meanings of minimum working time and priority can include other contents based on actual scene, which are not limited in the embodiments of this disclosure.

For another example, the M events can be M events that can share a time slice by grouping a plurality of conflicting events; among them, the grouping rule can be to group the events of the same business into one group and share a time slice, for example, the events of the same business such as sending events or receiving events can be grouped into one group. Alternatively, multiple events can be grouped based on users' subjective determination on events, for example, broadcast events and connection events can be grouped into one group based on users' needs. It can be understood that the basis for event grouping can include other contents based on the actual scene, which is not limited in this embodiments of the disclosure.

S302, processing a first event within a first time slice.

In the embodiment of the disclosure, the first event is an event with highest priority among the M events.

For example, the priority of the first event can be determined based on an identification of the first event. The identification of the first event can be characters, character strings, numbers or other types of identification such as bit information transmitted by one or more bits. For example, when the identification of the first event is 1, it can indicate that the priority of the first event is the highest, so the first event can be given priority to process within the first time slice.

S303, in a case that processing duration of the first event reaches the minimum working time of the first event, determining to continue to process the first event within the first time slice, or determining to interrupt processing of the first event and processing a second event within the first time slice.

For example, the second event may be an event with a lower priority than the first event within the first time slice, or, the second event may be an event that does not belong to the M events and has a higher priority than other events within the first event slice.

In the embodiment of the disclosure, when the events conflict, the priority of the event with high priority can be ensured to be processed based on the priority of each event, and the event can be processed reasonably based on the working state of continuation of work or interruption of work when the event reaches the minimum working time.

In a possible implementation, each of the events is further associated with: an identification of continuation of work or an identification of interruption of work when the processing duration of the event reaches the minimum working time; in the case that the processing duration of the first event reaches the minimum working time of the first event, determining to continue to process the first event within the first time slice, or determining to interrupt the processing of the first event and processing the second event within the first time slice includes: in the case that the processing duration of the first event reaches the minimum working time of the first event, if the first event is associated with the identification of continuation of work, determining to continue to process the first event within the first time slice; or, if the first event is associated with the identification of interruption of work, determining to interrupt the processing of the first event and processing the second event within the first time slice.

For example, the identification of continuation of work or interruption of work within the minimum working time could be characters, character strings, numbers or other types of identification such as bit information transmitted by one or more bits. For example, it can be determined whether to continue working or interrupt working based on information of a certain bit in the minimum working time. When the information of a certain bit is 0, it can indicate the identification of interruption of work; and when the information of a certain bit is 1, it can indicate the identification of continuation of work. The event can be processed within the first time slice based on the identification of continuation of work or interruption of work associated with the first event.

In the embodiment of the disclosure, the working state of the event can be conveniently identified based on the identification of continuation of work or interruption of work within the minimum working time, and the event can be processed based on the working state of the event conveniently.

In a possible implementation, after determining to interrupt the processing of the first event and processing the second event within the first time slice, the method further includes: in a case that the processing duration of the second event reaches the minimum working time of the second event and the second event is associated with the identification of continuation of work, continuing to process the second event within the first time slice; and in a case that processing of the second event is completed and there is remaining duration in the first time slice, continuing to process the first event in the first time slice.

Figure 4:
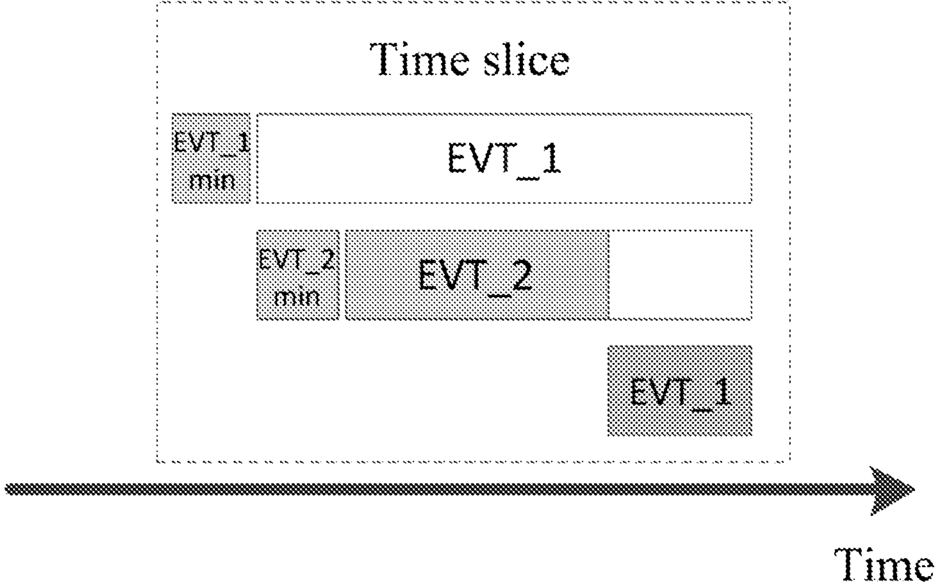
FIG. 4 is a second schematic diagram of an event processing method provided by an embodiment of the present disclosure.

Referring to FIG. 4, which is a second schematic diagram of an event processing method provided by an embodiment of the present disclosure.

For example, in a time slice, when EVT_1 and EVT_2 conflict, the EVT_1 with the highest priority can be processed based on the identification of the priority; when the processing duration of EVT_1 reaches the minimum working time (EVT_1 min), and the EVT_1 contains the identification of interruption of work, the processing of EVT_1 can be interrupted and the processing of EVT_2 can be started. When the processing of EVT_2 is completed, and there is still time left in the time slice, the interrupted EVT_1 can be continued to be processed within the time slice.

In the embodiment of the disclosure, when the EVT_1 which is processed with priority in the time slice contains the identification of the interruption of work, the EVT_2 which is processed second is finished, and there is time left in the time slice, the interrupted EVT_1 can be processed continuously in the remaining time slice, so that the multiplexing of the time slice is realized, and the utilization efficiency of the time slice is improved to the greatest extent.

In a possible implementation, each event is also associated with: an identification of allowed multiplexing of a time slice or an identification of not allowed multiplexing of a time slice; and determining to interrupt the processing of the first event and processing the second event within the first time slice includes: determining to interrupt the processing of the first event and selecting a second event associated with the identification of allowed multiplexing of the time slice among the M events; and processing the second event in the first time slice.

For example, the M events may include the identification of allowed multiplexing of a time slice and/or the identification of not allowed multiplexing of a time slice. The identification of the allowed multiplexing of a time slice of an event is the identification that when the time slice has time left, the event can be processed with the remaining time slice; the identification of not allowed multiplexing of a time slice is the identification that when there is time left in the time slice, the event cannot be processed with the remaining time slice. The identification of allowed multiplexing of a time slice or the identification of not allowed multiplexing of a time slice can be characters, character strings, numbers or other types of identification such as information transmitted by one or more bits, which is not limited in the embodiment of this disclosure.

In the embodiment of the disclosure, whether an event can be multiplexed within a time slice can be determined based on the identification of allowed multiplexing of a time slice or the identification of not allowed multiplexing of a time slice, and in the event processing process, the identification can be used to improve the processing efficiency of the event and realize the multiplexing of the time slices.

In a possible embodiment, the second event is an event whose priority is only lower than the first event among the M events.

For example, the priority of the second event is determined based on the identification of the priority of the event. When the identification of the priority of the event is a number and the number is a positive integer, the smaller the numerical value of the number, the higher the level of the event, and the priority of the events is determined. For example, when the identification of the priority of the first event is 1 and the identification of the priority of the second event is 2, it could indicate that the priority of the second event is only lower than the priority of the first event.

In a possible embodiment, the second event does not belong to the M events, and the priority of the second event is higher than the priority of the first event.

In a possible implementation, the method further includes in a case that the processing of the second event is not completed and the duration of the first time slice is exhausted, continuing to process the second event in a second time slice.

Figure 5:
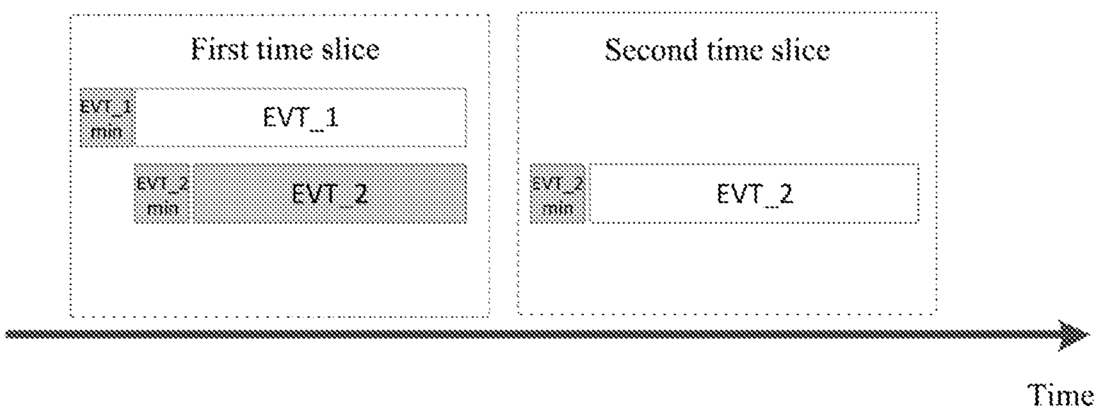
FIG. 5 is a third schematic diagram of an event processing method provided in an embodiment of the present disclosure.

Referring to FIG. 5, FIG. 5 is a third schematic diagram of an event processing method provided in an embodiment of the present disclosure. As shown in FIG. 5, EVT_1 is processed in the first time slice. When the processing duration of EVT_1 reaches the minimum working time (EVT_1 min) and the EVT_1 contains the identification of interruption of work, the processing of EVT_1 can be interrupted and EVT_2 can be processed. When EVT_2 is processed within the first time slice and cannot be processed completely, the second event can be processed continuously within the second time slice.

In the embodiment of the disclosure, in a case that the processing of the second event is not completed and the duration of the first time slice is exhausted, continuing to process the second event within a second time slice. It can not only realize the multiplexing of time slices, but also ensure the complete processing of events.

Figure 6:
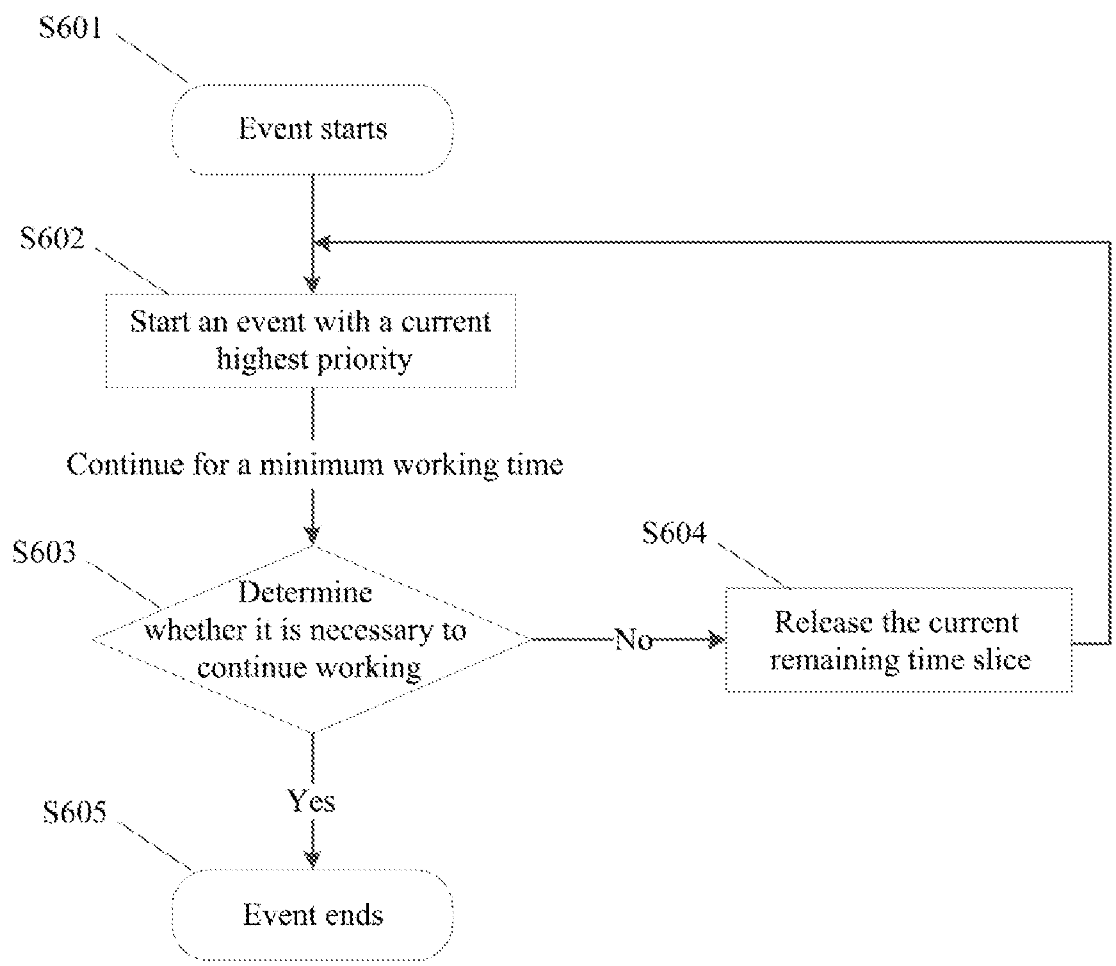
FIG. 6 is a flowchart of an event work provided in an embodiment of the present disclosure.

Based on the contents described in the above embodiments, in order to better understand the embodiments of the disclosure, please refer to FIG. 6, which is a schematic flow diagram of an event work provided in the embodiment of the disclosure. As shown in FIG. 6, the event work flow includes the following steps.

S601, event starts.

S602, start an event with a current highest priority.

S603, determine whether it is necessary to continue working.

When the processing duration of the highest priority event lasts until the minimum working time of the event, it can be determined whether it is necessary to continue working based on the identification of the working state within the minimum working time. When it is not necessary to continue working (or referred to as interrupt working), the step shown in S604 can be executed; and when it is necessary to continue working, the step shown in S605 can be executed.

S604, release the current remaining time slice.

Interrupting the event processing, releasing the current remaining time slice, and circularly executing the steps shown in S602-S603.

S605, event ends.

In the embodiment of the present disclosure, when a plurality of events in a time slice conflict, the events can be processed reasonably based on the priority of the events and minimum working time of the events through the steps shown in S601-S605, so as to realize the multiplexing of time slices and improve the utilization efficiency of time slices.

Figure 7:
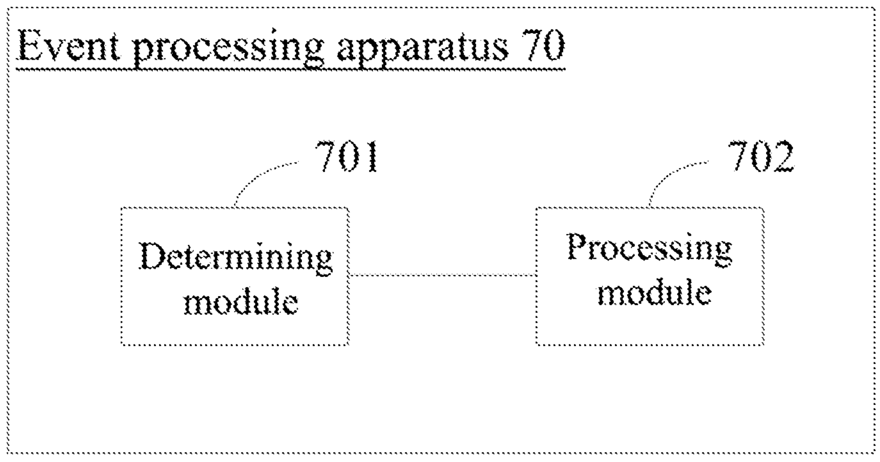
FIG. 7 is a schematic diagram of a program module of an event processing apparatus provided by an embodiment of the present disclosure.

Based on the contents described in the above embodiments, an event processing apparatus is also provided in an embodiment of this disclosure. Refer to FIG. 7, which is a schematic diagram of a program module of an event processing apparatus provided in the embodiment of this disclosure. The event processing apparatus 70 includes a determining module 701 and a processing module 702, where the processing module 702 is configured to determine M events, where each event is associated with a priority and a minimum working time, M is an integer greater than 1, and the minimum working time of each event is less than duration of a time slice; the processing module is further configured to process a first event within a first time slice, where the first event is an event with a highest priority among the M events; and a determining module, configured to in a case that processing duration of the first event reaches the minimum working time of the first event, determine to continue to process the first event within the first time slice, or determine to interrupt processing of the first event and process a second event within the first time slice.

The event processing apparatus 70 provided in an embodiment of the disclosure determines M events, processes a first event within a first time slice, and in a case that the processing duration of the first event reaches the minimum working time of the first event, determines to continue to process the first event within the first time slice, or determines to interrupt the processing of the first event and processes a second event within the first time slice. In this way, when there is a time conflict in a time slice, events can be processed reasonably in the time slice based on the minimum working time and priorities of the events, and the multiplexing of time slices can be realized, thus improving the processing efficiency of services In an embodiment, the determining module 701 is specifically configured to:

in the case that the processing duration of the first event reaches the minimum working time of the first event, if the first event is associated with an identification of continuation of work, determining to continue to process the first event within the first time slice; or, if the first event is associated with an identification of interruption of work, determining to interrupt the processing of the first event and processing the second event within the first time slice.

The event processing device 70 provided by the embodiment of the present disclosure can determine the working state of the event based on the identification of continuous work or interrupted work within the minimum working time conveniently, and facilitate the processing of the event based on the working state of the events.

In an embodiment, the processing module 702 is further configured to:

in a case that the processing duration of the second event reaches the minimum working time of the second event and the second event is associated with the identification of continuation of work, continue to process the second event in the first time slice; in a case that the second event is completed and there is a remaining time within the first time slice, continue to process the first event in the first time slice.

The event processing device 70 provided by the embodiment of the present disclosure can continue to process the interrupted first event in the remaining time slice when the first event that is processed with priority in the time slice contains the identification of interruption of work, and the second event that is processed second is finished, and the time slice has time left, thus realizing the multiplexing of the time slices and improving the utilization efficiency of the time slice to the greatest extent.

In an embodiment, the determining module 701 is specifically configured to:

determine to interrupt the processing of the first event and select a second event associated with the identification of allowed multiplexing of a time slice among the M events; and process the second event in the first time slice.

The event processing device 70 provided by the embodiment of the present disclosure can determine whether an event can be multiplexed within a time slice based on an identification of allowed multiplexing of a time slice or an identification of not allowed multiplexing of a time slice, and can use the identification to improve the processing efficiency of the event and realize the multiplexing of time slices during the event processing.

In an embodiment, the second event is an event whose priority is only lower than the first event among the M events.

In an embodiment, the second event does not belong to the M events, and the priority of the second event is higher than the priority of the first event.

In the embodiment of the disclosure, an emergency event with the highest priority within the time slice can be processed, so that the time slice can be multiplexed and the event processing capability can be improved.

In an embodiment, the processing module 702 is further configured to:

in a case that the processing of the second event is not completed and the duration of the first time slice is exhausted, continue to process the second event in a second time slice.

The event processing device 70 provided by the embodiment of the present disclosure continues to process the second event in the second time slice in a case that the processing of the second event is not completed and the duration of the first time slice is exhausted. It can not only realize the multiplexing of time slices, but also ensure the complete processing of events.

Further, based on the content described in the above embodiment, the embodiment of the disclosure also provides an electronic device, which includes at least one processor and a memory; where the memory stores computer executable instructions; the at least one processor executes the computer executable instructions stored in the memory to implement the contents described in the embodiments of the above event processing method.

The electronic device provided in this embodiment can be used to implement the technical scheme of the above-mentioned method embodiment, and their implementation principle and technical effect are similar, so the details of this embodiment are not repeated here.

Figure 8:
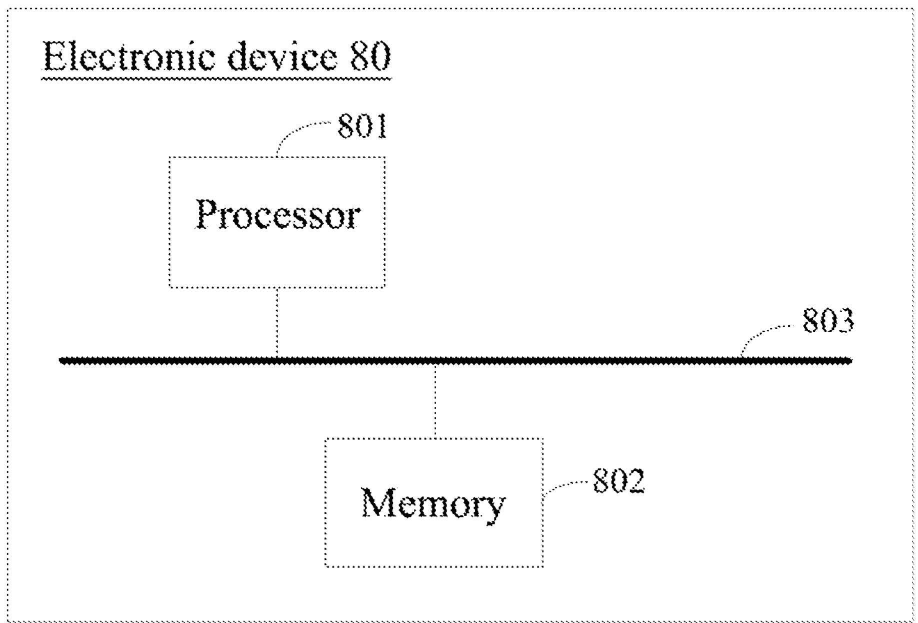
FIG. 8 is a schematic diagram of the hardware structure of an electronic device provided by an embodiment of the present disclosure.

In order to better understand the embodiment of the disclosure, please refer to FIG. 8, which is a schematic diagram of the hardware structure of an electronic device provided by the embodiment of the disclosure.

As shown in FIG. 8, the electronic device 80 of this embodiment includes a processor 801 and a memory 802;

the memory 802 is configured to store computer executable instructions; and the processor 801 is configured to execute the computer executable instructions stored in the memory to implement the steps executed by a user device in the above embodiments.

Alternatively, the processor 801 is configured to execute the computer executable instructions stored in the memory to implement the steps executed by a network device in the above embodiments.

For details, please refer to the related descriptions in the aforementioned method embodiments.

In an embodiment, the memory 802 may be independent or integrated with the processor 801.

When the memory 802 is independently set, the device further includes a bus 803 for connecting the memory 802 and the processor 801.

The embodiment of the disclosure also provides a computer readable storage medium, in which computer executable instructions are stored, and when the processor executes the computer executable instructions, various steps executed by the user device in the above embodiment are implemented.

Embodiments of the disclosure provide an event processing method and apparatus, which relates to the technical field of wireless communication and can solve a technical problem that in the related art, when events conflicts in a time slice, only one event can be selected and other events are abandoned, making it difficult to ensure the effective work of services.

In a first aspect, an embodiment of the application provides an event processing method, including: determining M events, where each event is associated with a priority and a minimum working time, M is an integer greater than 1, and the minimum working time of each event is less than duration of a time slice; processing a first event within a first time slice, where the first event is an event with a highest priority among the M events; and in a case that processing duration of the first event reaches the minimum working time of the first event, determining to continue to process the first event within the first time slice, or determining to interrupt processing of the first event and processing a second event within the first time slice.

In a possible implementation, each of the events is further associated with: an identification of continuation of work or an identification of interruption of work when the processing duration of the event reaches the minimum working time; and in the case that the processing duration of the first event reaches the minimum working time of the first event, determining to continue to process the first event within the first time slice, or determining to interrupt the processing of the first event and processing the second event within the first time slice includes: in the case that the processing duration of the first event reaches the minimum working time of the first event, if the first event is associated with an identification of continuation of work, determining to continue to process the first event within the first time slice; or, if the first event is associated with an identification of interruption of work, determining to interrupt the processing of the first event and processing the second event within the first time slice.

In a possible implementation, after determining to interrupt the processing of the first event and processing the second event within the first time slice, the method further includes: in a case that the processing duration of the second event reaches the minimum working time of the second event and the second event is associated with the identification of continuation of work, continuing to process the second event within the first time slice; and in a case that processing of the second event is completed and there is remaining duration in the first time slice, continuing to process the first event in the first time slice.

In a possible implementation, each of the events is further associated with: an identification of allowed multiplexing of a time slice or an identification of not allowed multiplexing of a time slice; and determining to interrupt the processing of the first event and processing the second event within the first time slice includes: determining to interrupt the processing of the first event and selecting a second event associated with the identification of allowed multiplexing of the time slice among the M events; and processing the second event in the first time slice.

In a possible implementation, the second event is an event with a priority only lower than the first event among the M events.

In a possible implementation, the second event does not belong to the M events and the priority of the second event is higher than the priority of the first event.

In a possible implementation, further including: in a case that the processing of the second event is not completed and the duration of the first time slice is exhausted, continuing to process the second event in a second time slice.

In a second aspect, an embodiment of the application provides an event processing apparatus, including: a processing module, configured to determine M events, where each event is associated with a priority and a minimum working time, M is an integer greater than 1, and the minimum working time of each event is less than duration of a time slice; the processing module is further configured to process a first event within a first time slice, where the first event is an event with a highest priority among the M events; and a determining module, configured to in a case that processing duration of the first event reaches the minimum working time of the first event, determine to continue to process the first event within the first time slice, or determine to interrupt processing of the first event and process a second event within the first time slice.

In a possible implementation, the determining module is specifically configured to: in the case that the processing duration of the first event reaches the minimum working time of the first event, if the first event is associated with an identification of continuation of work, determine to continue to process the first event within the first time slice; or, if the first event is associated with an identification of interruption of work, determine to interrupt the processing of the first event and process the second event within the first time slice.

In a possible implementation, where the processing module is further configured to:

in a case that the processing duration of the second event reaches the minimum working time of the second event and the second event is associated with the identification of continuation of work, continue to process the second event within the first time slice;

in a case that processing of the second event is completed and there is remaining duration in the first time slice, continue to process the first event in the first time slice.

In a possible implementation, the determining module is further specifically configured to: determine to interrupt the processing of the first event and select a second event associated with an identification of allowed multiplexing of a time slice among the M events; and process the second event in the first time slice.

In a possible implementation, the second event is an event with a priority only lower than the first event among the M events.

In a possible implementation, the second event does not belong to the M events and the priority of the second event is higher than the priority of the first event.

In a possible implementation, the processing module is further configured to:

in a case that the processing of the second event is not completed and the duration of the first time slice is exhausted, continue to process the second event in a second time slice.

In a third aspect, an embodiment of the present application provides an electronic device, including: at least one processor and a memory, the memory stores computer executable instructions;

the at least one processor execute the computer executable instructions stored in the memory to cause the at least one processor to implement the event processing method according to the first aspect.

In a fourth aspect, an embodiment of the present application provides computer readable storage medium, where the computer readable storage medium stores computer executable instructions, which when executed by a processor, implements the event processing method according to the first aspect.

Embodiments of the application provide an event processing method and apparatus, including: determining M events, where each event is associated with a priority and a minimum working time, M is an integer greater than 1, and the minimum working time of each event is less than duration of a time slice; processing a first event within a first time slice, where the first event is an event with a highest priority among the M events; and in a case that processing duration of the first event reaches the minimum working time of the first event, determining to continue to process the first event within the first time slice, or determining to interrupt processing of the first event and processing a second event within the first time slice. In this way, when there is a time conflict in a time slice, events can be processed reasonably in the time slice based on the minimum working time and priorities of the events, and the multiplexing of time slices can be realized, thus improving the processing efficiency of services.

In several embodiments provided by this disclosure, it should be understood that the disclosed devices and methods can be realized in other ways. For example, the device embodiment described above is only schematic. For example, the division of the modules is only a logical function division. In actual implementation, there may be other division methods, such as multiple modules can be combined or integrated into another system, or some features can be ignored or not implemented. On the other hand, the mutual coupling or direct coupling or communication connection shown or discussed can be indirect coupling or communication connection through some interfaces, apparatus or modules, which can be electrical, mechanical or other forms.

The modules described as separate components may or may not be physically separated, and the components displayed as modules may or may not be physical units, that is, they may be located in one place or distributed to multiple network units. Some or all of the modules can be selected based on actual needs to achieve the purpose of the scheme of this embodiment.

In addition, each functional module in each embodiment of the disclosure can be integrated into one processing unit, or each module can exist physically alone, or two or more modules can be integrated into one unit. The above-mentioned modular units can be realized in the form of hardware, or in the form of hardware plus software functional units.

The above-mentioned integrated modules realized in the form of software functional modules can be stored in a computer readable storage medium. The above software function module is stored in a storage medium, and includes several instructions to make a computer device (which can be a personal computer, a server, a network device, etc.) or a processor (English: processor) to execute part of the steps of the method described in various embodiments of the present disclosure.

It should be understood that the processor can be a central processing unit (CPU for short), other general processors, digital signal processor (DSP for short), application specific integrated circuits (ASIC for short), etc. The general processor can be a microprocessor or the processor can be any conventional processor, etc. The steps of the method disclosed in connection with the disclosure can be directly embodied as being completed by execution of a hardware processor, or being completed by execution of a combination of hardware and software modules in the processor.

The memory may include high-speed RAM memory, and may also include nonvolatile storage NVM, such as at least one disk memory, and may also be a U disk, a mobile hard disk, a read-only memory, a magnetic disk or an optical disk.

The bus can be an industry standard architecture (ISA) bus, a peripheral component interconnect (PCI) bus or an extended industry standard architecture (EISA) bus. Bus can be divided into address bus, data bus and control bus. For the convenience of representation, the bus in the drawings of this disclosure is not limited to only one bus or one type of bus.

The above storage medium can be realized by any type of volatile or nonvolatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk. The storage medium can be any available medium that can be accessed by a general-purpose or special-purpose computer.

An exemplary storage medium is coupled to a processor so that the processor can read information from and write information to the storage medium. Of course, the storage medium can also be an integral part of the processor. The processor and the storage medium can be located in an application specific integrated circuit (ASIC for short). Of course, the processor and the storage medium can also exist as separate components in the electronic device or the main control device.

It can be understood by those skilled in the art that all or part of the steps for implementing the above method embodiments can be completed by hardware related to program instructions. The aforementioned program can be stored in a computer-readable storage medium. When the program is executed, the steps including the above method embodiments are executed; The aforementioned storage medium include ROM, RAM, magnetic disk or optical disk and other medium that can store program codes.

Finally, it should be explained that the above embodiments are only used to illustrate the technical scheme of the disclosure, but not to limit it. Although the present disclosure has been described in detail with reference to the foregoing embodiments, it should be understood by those skilled in the art that the technical scheme described in the foregoing embodiments can still be modified, or some or all of its technical features can be replaced by equivalents. However, these modifications or substitutions do not make the essence of the corresponding technical solutions deviate from the scope of the technical solutions of various embodiments of this disclosure.

The invention claimed is:

1. An event processing method, comprising:

determining M events, wherein each event is associated with a priority and a minimum working time and is further associated with: an identification of continuation of work or an identification of interruption of work in a case that processing duration of the event reaches the minimum working time, M is an integer greater than 1, and the minimum working time of each event is less than duration of a time slice;

processing a first event within a first time slice, wherein the first event is an event with a highest priority among the M events;

in a case that processing duration of the first event reaches the minimum working time of the first event, based on that the first event is associated with the identification of continuation of work, determining to continue to process the first event within the first time slice;

or, based on that the first event is associated with the identification of interruption of work, determining to interrupt processing of the first event and processing a second event within the first time slice;

after determining to interrupt the processing of the first event and processing the second event within the first time slice, in a case that the processing duration of the second event reaches the minimum working time of the second event and the second event is associated with the identification of continuation of work, continuing to process the second event within the first time slice;

in a case that processing of the second event is completed and there is remaining duration in the first time slice, continuing to process the first event in the first time slice.

2. The method according to claim 1, wherein each of the events is further associated with: an identification of allowed multiplexing of a time slice or an identification of not allowed multiplexing of a time slice; and determining to interrupt the processing of the first event and processing the second event within the first time slice comprises:

determining to interrupt the processing of the first event and selecting a second event associated with the identification of allowed multiplexing of the time slice among the M events; and processing the second event in the first time slice.

3. The method according to claim 2, wherein the second event is an event with a priority lower than the first event among the M events.

4. The method according to claim 1, wherein the second event does not belong to the M events and the priority of the second event is higher than the priority of the first event.

5. The method according to claim 1, further comprising:

in a case that the processing of the second event is not completed and the duration of the first time slice is exhausted, continuing to process the second event in a second time slice.

6. An event processing apparatus, comprising:

at least one processor and a memory;

the memory stores computer executable instructions;

at least one processor executes the computer executable instructions stored in the memory to:

determine M events, wherein each event is associated with a priority and a minimum working time and is further associated with: an identification of continuation of work or an identification of interruption of work in a case that processing duration of the event reaches the minimum working time, M is an integer greater than 1, and the minimum working time of each event is less than duration of a time slice;

process a first event within a first time slice, wherein the first event is an event with a highest priority among the M events; and in a case that processing duration of the first event reaches the minimum working time of the first event, based on that the first event is associated with the identification of continuation of work, determine to continue to process the first event within the first time slice;

or, based on that the first event is associated with the identification of interruption of work, determine to interrupt processing of the first event and process a second event within the first time slice;

after determining to interrupt the processing of the first event and processing the second event within the first time slice, in a case that the processing duration of the second event reaches the minimum working time of the second event and the second event is associated with the identification of continuation of work, continue to process the second event within the first time slice;

in a case that processing of the second event is completed and there is remaining duration in the first time slice, continue to process the first event in the first time slice.

7. The apparatus according to claim 6, wherein the processor is specifically configured to:

determine to interrupt the processing of the first event and select a second event associated with an identification of allowed multiplexing of a time slice among the M events; and process the second event in the first time slice.

8. The apparatus according to claim 7, wherein the second event is an event with a priority lower than the first event among the M events.

9. The apparatus according to claim 6, wherein the second event does not belong to the M events and the priority of the second event is higher than the priority of the first event.

10. The apparatus according to claim 6, wherein the processor is further configured to:

in a case that the processing of the second event is not completed and the duration of the first time slice is exhausted, continue to process the second event in a second time slice.

11. A non-transitory computer readable storage medium, wherein the non-transitory computer readable storage medium stores a computer program, which when executed by a processor, the processor is enabled to:

determine M events, wherein each event is associated with a priority and a minimum working time and is further associated with: an identification of continuation of work or an identification of interruption of work in a case that processing duration of the event reaches the minimum working time, M is an integer greater than 1, and the minimum working time of each event is less than duration of a time slice;

process a first event within a first time slice, wherein the first event is an event with a highest priority among the M events;

in a case that processing duration of the first event reaches the minimum working time of the first event, based on that the first event is associated with the identification of continuation of work, determine to continue to process the first event within the first time slice;

or, based on that the first event is associated with the identification of interruption of work, determine to interrupt processing of the first event and process a second event within the first time slice;

after determining to interrupt the processing of the first event and processing the second event within the first time slice, in a case that the processing duration of the second event reaches the minimum working time of the second event and the second event is associated with the identification of continuation of work, continue to process the second event within the first time slice;

in a case that processing of the second event is completed and there is remaining duration in the first time slice, continue to process the first event in the first time slice.

12. The non-transitory computer readable storage medium according to claim 11, wherein each of the events is further associated with: an identification of allowed multiplexing of a time slice or an identification of not allowed multiplexing of a time slice; and when the computer program is executed by the processor, the processor is further enabled to:

determine to interrupt the processing of the first event and select a second event associated with the identification of allowed multiplexing of the time slice among the M events; and process the second event in the first time slice.

13. The non-transitory computer readable storage medium according to claim 12, wherein the second event is an event with a priority lower than the first event among the M events.

14. The non-transitory computer readable storage medium according to claim 11, wherein the second event does not belong to the M events and the priority of the second event is higher than the priority of the first event.

15. The non-transitory computer readable storage medium according to claim 11, wherein the processor is further enabled to:

in a case that the processing of the second event is not completed and the duration of the first time slice is exhausted, continue to process the second event in a second time slice.

* * * * *